US006527344B2

United States Patent
Takei

(10) Patent No.: US 6,527,344 B2
(45) Date of Patent: Mar. 4, 2003

(54) HEADREST

(75) Inventor: Yoshiyuki Takei, Tokyo (JP)

(73) Assignee: Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 09/986,092

(22) Filed: Nov. 7, 2001

(65) Prior Publication Data

US 2002/0050731 A1 May 2, 2002

(51) Int. Cl.$^7$ ................................................. B60N 2/48
(52) U.S. Cl. ..................... 297/391; 264/46.6; 264/46.7; 297/408; 297/220
(58) Field of Search ................................ 297/220, 391, 297/408, DIG. 1; 264/46.6, 46.7

(56) References Cited

U.S. PATENT DOCUMENTS

| | | | |
|---|---|---|---|
| 4,738,809 A | * 4/1988 | Storch ........................ | 264/46.6 |
| 5,261,726 A | 11/1993 | Yanagishita | |
| 5,478,136 A | * 12/1995 | Takeuchi et al. ............. | 297/391 |
| 5,681,088 A | 10/1997 | Takei | |
| 5,855,831 A | * 1/1999 | Takei ........................ | 264/46.6 |
| 5,967,612 A | * 10/1999 | Takei ........................ | 297/391 |
| 6,200,506 B1 | 3/2001 | Takei | |

FOREIGN PATENT DOCUMENTS

| | | |
|---|---|---|
| JP | 6-86608 | 12/1994 |
| JP | 9-254165 | 9/1997 |

* cited by examiner

*Primary Examiner*—Peter R. Brown
(74) *Attorney, Agent, or Firm*—Browdy and Neimark

(57) ABSTRACT

A headrest with a moveable headrest stay, which comprises a trim cover assembly of three-dimensional configuration and a foam padding filled in the trim cover assembly together with a part of the headrest stay. The trim cover assembly includes a first extension and a second extension, both which are folded and joined together to project inwardly thereof, with a though-opening area defined therebetween, wherein the through-opening has one side opened outwardly of the trim cover assembly and another side opened inwardly of the same. The first extensions has a region longer than the second extension, with a slit formed in that region. This particular region is folded over the second extension and fixed thereto, thereby sealing the afore-said another side of the through-opening. The headrest stay passes through the through-opening area and slit, such that the slit is attached closely about the peripheral surface of the headrest stay.

10 Claims, 3 Drawing Sheets

HEADREST

BACKGROUND OF INVENTION

1. Field of the Invention

The present invention relates to a headrest for use with an automotive seat. More particularly, the invention is directed to an inclinable headrest with a headrest stay to be mounted on the seat, which is formed by inserting a part of the headrest stay in the interior of a preformed three-dimensional trim cover assembly, then injecting a liquid foaming material therein, and finally subjecting those trim cover assembly, liquid foaming material and part of the headrest stay to foaming integrally together.

2. Description of Prior Art

There has been known an inclinable headrest for use with an automotive seat, which typically has a pair of headrest stays to be mounted on a top of the seat and can be adjustably tilted forwardly and backwardly relative to the two headrest stays. In most instances, this kind of headrest is formed with a pair of elongated openings in the bottom wall thereof, through which such pair of headrest stays pass, respectively, thereby allowing those particular two headrest stays to move along the two elongated openings relative to a center of rotation in the headrest. As such, the headrest itself is free to be tilted in a fore-and-aft direction without interference with the headrest stays.

In assembling the headrest, a pair of headrest stays or a headrest frame integral with those two stays are first inserted into the interior of a preformed three-dimensional trim cover assembly having a pair of elongated openings formed in the bottom wall thereof, while projecting the two headrest stays outwardly through the respective two elongated openings. Then, a liquid foaming material is injected in the interior of trim cover assembly, followed by a foaming step wherein the trim cover assembly, liquid foaming material and a part of the headrest stays are foamed integrally together, using a foaming die device.

In the foaming step, a leakage of the liquid foaming material through the two openings has been a problem, and therefore, various means and solutions thereto has been used and proposed. In particular, as disclosed in the Japanese Laid-Open Patent Publication No. 6-86608, a tubular plastic material is provided within a headrest trim cover assembly and is sewn at its upper edge with the peripheral edges of an opening defined in the trim cover assembly, through which opening a headrest stay extends outwardly. The tubular plastic material in this prior art surrounds the perimeter of the headrest stay, thereby serving to preclude the headrest stay opening from being loosely opened. But, the tubular plastic material has to be provided independently of the trim cover assembly and requires a hard and troublesome sewing with the edges of headrest stay opening, which results in reducing a rapidity and efficiency in production of headrest. Further, the tubular material is of a relatively hard property that can not be attached closely about the perimeter of the headrest stay, and thus, it is highly possible that a liquid foaming material will be leaked through a small clearance between the tubular material and headrest stay.

As a solution to the problem, the inventor of the present invention previously developed an improved structure of headrest which is disclosed from the U.S. Pat. No. 5,681,088 assigned to the same assignee as in the present invention. According thereto, a headrest trim cover assembly having an elastic property has a pair of integral extensions defined in an opening which is formed in the trim cover assembly to allow a headrest stay to pass therethrough. Such two integral extensions are both folded downwardly from the edges of that opening and sewn together in the interior of trim cover assembly such that an elongated slot area and a through-hole area are defined in the sewn two extension, wherein the through-hole area is substantially equal in diameter to the headrest stay. The elongated slot area allows a fore-and-aft movement of the headrest stay so that a resulting headrest body may be tilted forwardly and backwardly relative to the headrest stay, whereas the through-hole area is closely attached about the headrest stay. Therefore, during a foaming process subjecting the trim cover assembly and headrest stay to foaming together integrally, both two extensions are brought to intimate contact with each other, whereby it is possible to completely prevent leakage of a liquid foaming material through those two holes.

However, the two folded extensions project relatively long within the trim cover assembly. This has been found defective when it is applied to a doughnut-like annular shape of headrest, because such long projected extensions can not be accommodated in the annular inner conduit of such doughnut-like headrest. Also, even in other normal kinds of headrests than the doughnut-like headrest, the long projected extensions has been found defective in that, at a foaming step, a liquid foaming material injected in the trim cover assembly is not sufficiently expanded and cured around those particular long extensions.

SUMMARY OF THE INVENTION

In view of the above-stated drawbacks, it is therefore a primary purpose of the present invention to provide an improved headrest which is not only capable of making short two folded extensions which project inwardly of headrest trim cover assembly and allow insertion of a headrest stay therethrough, but also is of a simplified structure for preventing leakage of a liquid foaming material through the two folded extensions during a foaming process.

To achieve such purpose, the headrest in accordance with the present invention basically comprises:

at least one headrest stay;

a trim cover assembly of three-dimensional configuration conforming to an outer shape of the headrest;

the at least one headrest stay being placed in the trim cover assembly, with a part of the headrest stay passing through a predetermined point on the trim cover assembly and projecting outwardly therefrom;

a foam padding provided within said trim cover assembly, said foam padding being formed and filled therein by a foaming process including the step of injecting and curing a liquid foaming material within the trim cover assembly;

the trim cover assembly including:

at least one first extension which is defined at the predetermined point and folded therefrom in a direction inwardly of the trim cover assembly;

at least one second extension which is defined at the predetermined point and folded therefrom in a direction inwardly of the trim cover assembly;

the at least one first extension being greater in length than the at least one second extension, thus having a region extending beyond a free end of the at least one second extension;

wherein such region of the at least one first extension has a through-opening means defied therein, said through-opening means being so arranged as to allow the headrest stay to pass therethrough while being able to be attached closely about a peripheral surface of the headrest stay;

wherein those first and second extensions are contacted and fixedly joined with each other, so that a through-opening area is defined therebetween at the predetermined point, wherein one side of the through-opening area is opened outwardly of the trim cover assembly while another side thereof is opened inwardly of the trim cover assembly;

wherein the afore-said region of the first extension is folded about the free end of the second extension, so that the thus-folded region closes and seals the foregoing another side of the through-opening area, with said through-opening means laying thereover; and wherein the headrest stay passes through the through-opening area and the through-opening means.

Accordingly, the first extension can be folded by an amount generally half the second extension, so that it is possible to reduce the length of the whole two extensions to a minimum degree by reducing the length of second extension to a smallest possible amount. Hence, both two extensions are made small in projection, which allows both of them to be accommodated in a relatively small space area within a trim cover assembly. Further, such small projection of extensions avoids insufficient foamed points therearound.

Other various features and advantages will become apparent from reading of the descriptions hereinafter, with reference to the annexed drawings.

DETAILED DESCRIPTION OF PREFERRED EMBODIMENT OF THE PRESENT INVENTION

Figure 1:
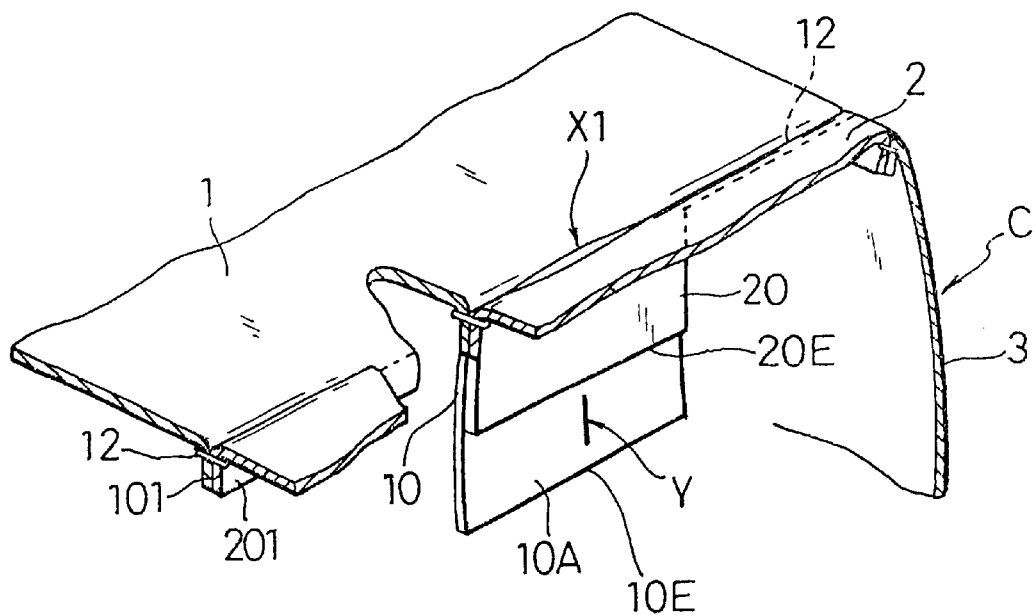
FIG. 1 is a partly broken fragmentary perspective view of a headrest trim cover assembly, which shows first and second extensions, a principal part of the present invention.
Figure 7:
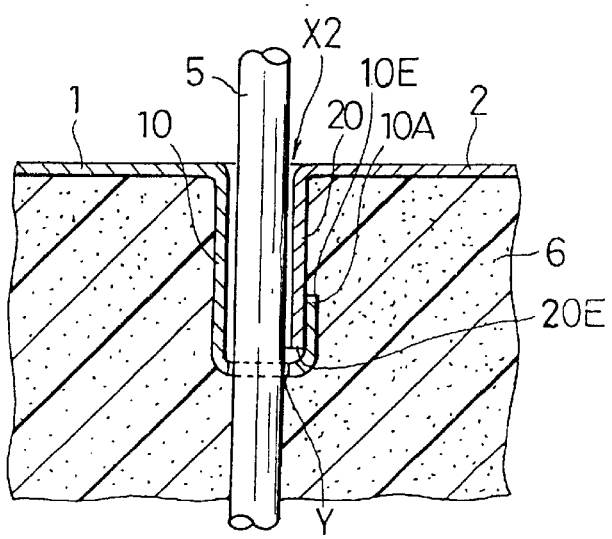
FIG. 7 is a partly enlarged view showing the principal part of the present invention in conjunction with the FIG. 5.

Referring to FIGS. 1 and 7, there is illustrated a preferred mode of a headrest for use with an automotive seat, which is comprised of a three-dimensional trim cover assembly (C), having an outer configuration of a predetermined headrest body, a headrest frame (50), a pair of headrest stays (5) (5) rotatably connected with the headrest frame (50), and a foam padding (6) filled in the trim cover assembly (C) integrally with the headrest frame (50) and a part of the two headrest stays (5).

Figure 5:
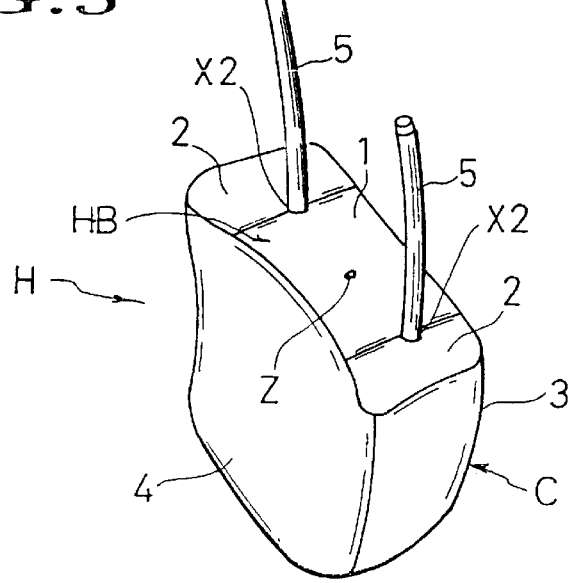
FIG. 5 is a schematic perspective view of the whole headrest.

As can be seen from FIG. 5, briefly stated, the headrest trim cover assembly (C) is formed by sewing together several separate cover sections such as to define therein a frontal cover region (3), a rear cover region (4) opposite to the frontal cover region (3), and a bottom cover region (HB), for instance. In this context, it is defined hereby that the frontal cover region (3) faces to a side forwardly of the headrest (H), thus forming a surface to receive the head of passenger (not shown), whereas the rear cover region (4) faces to a side rearwardly of the headrest (H). In ordinary, a pair of through-openings, which are generally represented by the one designated by (X1) in FIG. 1, are initially defined in the bottom cover region (HB) with a view to allowing insertion of a pair of headrest stays (5) therethrough, respectively.

Figure 4:
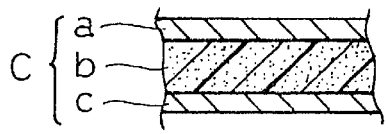
FIG. 4 is a sectional view of the trim cover assembly, showing its three-layer lamination structure.

As shown in FIG. 4, it is noted that the trim cover assembly (C) is of a three-layer lamination structure comprising a top skin layer (a), a thin foam padding layer (b) and a back cover layer (c) in this order, and therefore, each of the cover sections to form the trim cover assembly (C) is of such three-layer lamination structure. Hence, each cover section (1, 2, 3 and 4) per se is naturally provided with an elastic and repercussive property.

In particular, the bottom cover region, as generally designated by (HB), of trim cover assembly (C) is defined by sewing together a first cover section (1) and a pair of second cover sections (2) (2). That is, as understandable from the figures, the forward and rearward longitudinal end portions (i.e. seam allowance) of first cover section (1) are respectively sewn with the mating longitudinal end portions (i.e. seam allowances) of two cover sections which form the frontal and rear cover regions (3) (4), respectively. Also, the two lateral ends of the first cover section (1) are respectively sewn with a corresponding end of one of the two second cover sections (2) and a corresponding end of another of the same (2).

Again, as stated earlier, the designations (X1) stand for a pair of through-openings, respectively, which are initially defined in the bottom cover region (HB) for allowing the two respective two headrest stays (5) to pass therethrough. As will become apparent, the present invention provides an improvement to a pair of areas adjacent and corresponding to the respective two through-openings (X1) in the bottom cover region (HB) of trim cover assembly (C). But, since both constructions of those pair of areas, which form a principal part of the present invention to be elaborated, are identical to each other, a specific description will be only made as to one of the two areas in question, for the sake of simplicity.

Figure 2:
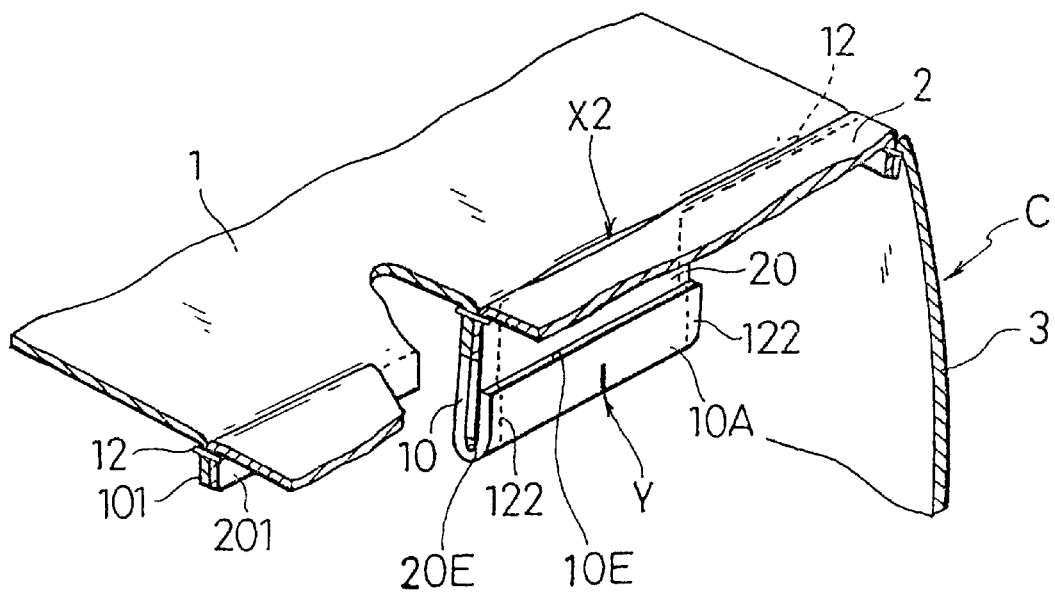
FIG. 2 is a partly broken fragmentary perspective view of a headrest trim cover assembly, which shows the state the first extension is folded and sewn with the second extension.

Now, reference is made to FIGS. 1 and 2. In accordance with the present invention, the first cover section (1) has a downwardly folded edge portion (101) defined in and along the lateral side thereof, the folded edge portion (101) serving as a seam allowance, and also the first cover section (1) has a first integral extension (10) which extends downwardly and continuously from a midway area of the folded edge portion (101). On the other hand, likewise, the second cover section (2) has a downwardly folded edge portion (201) defined in and along the lateral side thereof, which serves as a seam allowance to be sewn with the folded edge portion (101) of the first cover section (1). The second cover section (2) also has a second integral extension (20) which extends downwardly and continuously from a midway area of the folded edge portion (201) thereof, wherein the second extension (20) is small in length relative to the foregoing first extension (10). In other words, as understandable from FIG. 1, the first extension (10) is longer than the second extension (20), thus having a foldable area (10A) which projects a predetermined distance beyond the free end of the second extension (20). As shown, a vertically elongated slit (Y) is formed in the foldable area (10A) of the first extension (10). More specifically, the slit (Y) is disposed centrally of the foldable area (10A) such as to extend from a point adjacent to a predetermined juxtaposition area where the second extension (20) is to be juxtaposed on a substantially half of the first extension (10), down to another point which is spaced a given distance from the extremity (10E) of the first extension (10), as can be observed from FIG. 1. The length of slit (Y) is slightly greater than the outer diameter of headrest stay (5). It is noted that both first and second extensions (10) (20) are also of the previously stated three-layer lamination structure comprising a top cover layer (a), a thin foam padding layer (b) and a back cover layer (c), as in FIG. 4. Hence, each of the two extensions (10) (29) is of an elastic and repercussive property.

In assembly, as shown in FIG. 1, those two folded edge portions (101) (201) respectively of the first and second cover sections (1) (2) are sewn together by a thread (12) along the longitudinal direction thereof, excepting a region substantially corresponding to the first and second downward extensions (10) (20). Since the thus-sewn two folded edge portions (101) (201) both project inwardly of the trim cover assembly (C), the first and second extensions (10) (20) are juxtaposed on each other at the predetermined juxtaposition area as stated above, and thus they both project vertically into the interior of the trim cover assembly (C) in a fashion dependent from the inner wall of the bottom cover region (HB). At this stage, as in FIG. 1, about a half of the first extension (10) is juxtaposed on one side surface of the second extension (20), with the foldable area (10A) thereof extending generally straight beyond the end (20E) of second extension (20) and with the slit (Y) laying vertically in the foldable area (10A). Further, at this point, an elongated through-opening (X1) is defined between the first and second extensions (10) (20), penetrating therethrough so as to establish an open communication between the outside and inside of the trim cover assembly (C). The through-opening (X1) is resiliently closed by a contact between the first and second extensions (10) (20) due to the elastic and repercussive property of the previously stated three-layer lamination structure of each of the two extensions (10, 20).

Then, as shown in FIG. 2, the foldable area (10a) is folded upwardly about the end (20E) of second extension (20) onto another side surface of that particular second extension (20) opposite to the foregoing one side surface thereof. Under this state, a sewing is performed as by a sewing machine to sew the thus-folded unit of two extensions (10) (20) along the two lateral sewing lines hereof as indicated by (122) (122). It is therefore seen that the lower side of the through-opening (X1) is completely closed, whereupon, now, an outwardly opened slit-like region (X2) is defined within the folded and sewn two extensions (10) (20), which provides an outwardly opened point allowing the headrest stay (5) to pass therethrough and project outwardly of the trim cover assembly (C). Also, it is seen that the slit (Y) is bent in a generally "U" shape, extending transversely of a longitudinal direction of the outwardly opened slit-like region (X2), whereupon the slit (Y) now forms an inwardly opened area opposite to the outwardly opened slit-like region (X2), thereby allowing the headrest stay (5) to be inserted therethrough into the slit-like region (X2) and serving to sealably and tightly encircle the circumferential surface of the headrest stay (5), as will be described later. For that purpose, the slit (Y) should preferably have a proper length relative to the outer diameter of headrest stay (5). Furthermore, it is appreciated that, by folding the first extension (10) generally in half about the end (20E) of second extension (20), it is possible to limit the projection of the whole two extensions (10) (20) close to a projection amount of the second extension (20); in other words, it is possible to reduce the length of the whole two extensions (10) (20) to a minimum degree by reducing the length of second extension (20) to a smallest possible amount. In this regard, the length of first extension (10) should be adjusted in advance to an amount generally half the thus-reduced length of second extension (20). Needless to state, such reduction of length of the two extensions (10) (20) should be carefully done, taking into account the length of slit (Y) required for allowing the headrest stay (5) to be passed therethrough and for closely encircling the circumferential surface of headrest stay (5).

Figure 3:
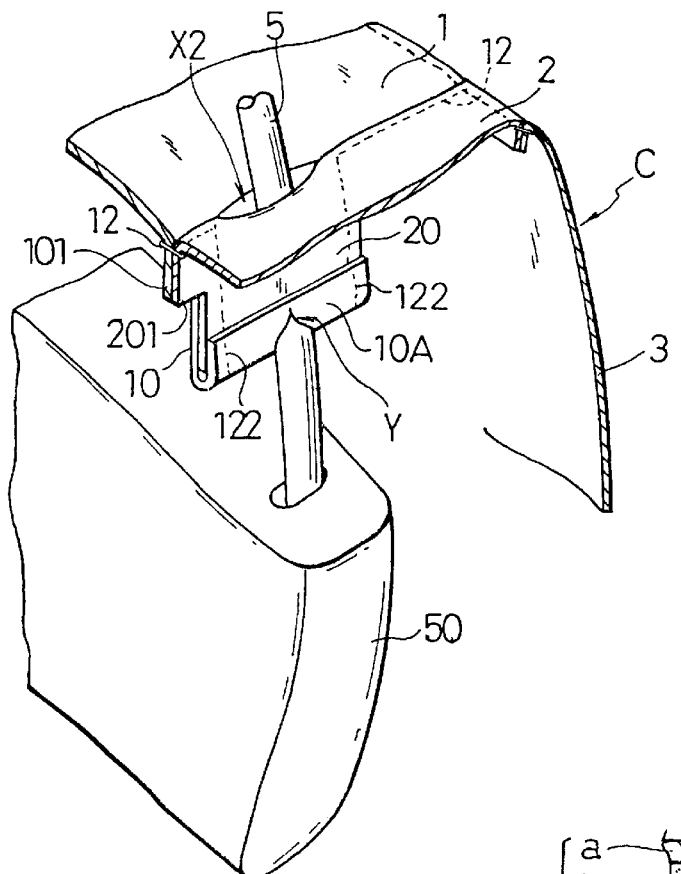
FIG. 3 is a partly broken fragmentary perspective view showing that a headrest stay is inserted through the sewn first and second extensions.

Next, as shown in FIG. 3, the headrest frame unit, which comprises a headrest frame (50) and the pair of headrest stays (5) whose end portions are rotatably provided in the headrest frame (50), is placed within the trim cover assembly (C), prior to forming a complete three-dimensional body of the trim cover assembly (C). At this step, as understandable from the FIG. 3, each headrest stay (5) is inserted forcibly through the slit (Y) and passed through the outwardly opened slit-like region (X2), projecting outwardly of the trim cover assembly (C). In this regard, the slit (Y) is elastically opened by such insertion of the headrest stay (5) therethrough, but the slit (Y) per se, by the reason of its elastic nature being inherent from the three-layer lamination structure stated above, tends to tight and closely encircle the circumferential surface of headrest stay (5) so that any clearance is not created between the slit (Y) and headrest stay (5).

Figure 6:
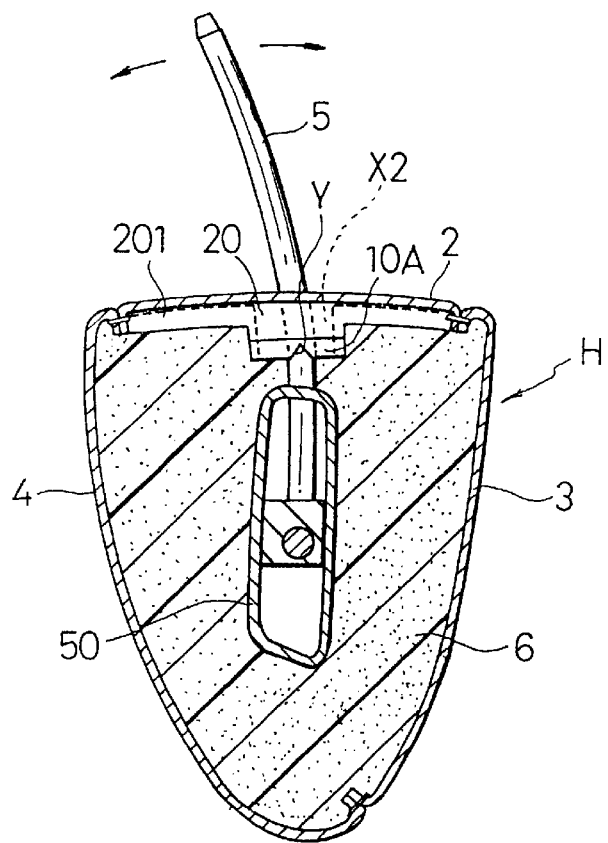
FIG. 6 is a longitudinal section of the headrest shown in the FIG. 5.

Then, while not shown, the incomplete headrest unit thus formed, (i.e. the three-dimensional sewn body of trim cover assembly (C) and the headrest frame unit placed therewithin, with the two headrest stays (5) projecting outwardly from the respective two slit-like regions (X2)), is subjected to a foaming process, using a suitable forming die devices. As is known, the foaming process involves inserting an injection nozzle in the injection hole (Z) formed in the first cover section (1) (see FIG. 5), injecting a liquid foaming material (not shown) via the injection nozzle into the interior of the trim cover assembly (C), and effecting a foaming to cause curing and expanding of the liquid foaming material, so that the foaming material increases its mass within the trim cover assembly (C) and becomes cured to create a foam padding (6) filled therein together integrally with the headrest frame (50), the trim cover assembly (C) and a small part of each headrest stay (5). As a result thereof, as shown in FIGS. 5 and 6, there is obtained a complete headrest (H). During the foaming process, the fact that the slit (Y) closely encircles the headrest stay (5) insures to preclude the liquid foaming material from being leaked through the slit (Y) into the outwardly opened slit-like region (X2). Accordingly, in the resulting headrest (H), there is no leakage of liquid foaming material into the slit-like region (X2), which means that any cured residue of the foaming material is not left therein. Thus, the headrest stay (5) can be smoothly moved in that slit-like region (X2) along the fore-and-aft direction thereof as indicated by the arrows in FIG. 6. Precisely stated, the headrest (H) is smoothly inclinable forwardly and backwardly, without any interference with such cured residue of foaming material, relative to the two headrest stays (5) which are fixed upon a vehicle seat, though not shown.

From the description above, it is appreciated that the present invention has the following effects and advantages:

(i) The first extension (10) can be folded by an amount generally half the second extension (20). In other words, it is possible to reduce the length of the whole two extensions (10) (20) to a minimum degree by reducing the length of second extension (20) to a smallest possible amount. Of course, the length of first extension (10) should be adjusted in advance to an amount generally half the thus-reduced length of second extension (20). Therefore, both two extensions (10) (20) are made small in projection, which allows both of them to be accommodated in a relatively small space area within a doughnut-like hardest trim cover assembly, for instance. Further, such small projection of extensions (10) (20) avoids insufficient foamed points therearound, in contrast to the hitherto long projected extensions of this kind. Accordingly, there is eliminated the previously stated problem with the conventional structure of headrest.

(ii) By folding the first extension (10) about the end of second extension (20) and sewing together both two extensions (10) (20) along the two spaced-apart lateral sides thereof, it is quite easily possible to not only seal and close the lower opened side of the through-opening (X1) completely, but also transform the through-opening (X1) into the configuration defining an outwardly opened slit-like region (X2) which allows the fore-and-aft movement of headrest stay (5) therein; and an inwardly opened slit (Y) which closely encircles the perimeter of the headrest stay (5) to completely prevent leakage of liquid foaming material therethrough.

Finally, it should be understood that the present invention is not limited to the illustrated embodiment, but any other modifications, replacements and additions may be structurally applied thereto without departing from the scopes of the appended claims.

What is claimed is:

1. A headrest comprising:
   at least one headrest stay;
   a trim cover assembly of three-dimensional configuration conforming to an outer shape of the headrest;
   said at least one headrest stay being placed in said trim cover assembly, with a part of the headrest stay passing through a predetermined point in the trim cover assembly and projecting outwardly therefrom;
   a foam padding provided within said trim cover assembly, said foam padding being formed and filled therein by a foaming process including the step of injecting and curing a liquid foaming material within the trim cover assembly;
   said trim cover assembly including:
      at least one first extension which is defined at said predetermined point and folded therefrom in a direction inwardly of the trim cover assembly;
      at least one second extension which is defined at the predetermined point and folded therefrom in a direction inwardly of the trim cover assembly;
      said at least one first extension being greater in length than said at least one second extension, thus having a region extending beyond a free end of said at least one second extension;
      said region of the at least one first extension having a through-opening means defined therein, said through-opening means being so arranged as to allow said headrest stay to pass therethrough while being able to be attached closely about a peripheral surface of the headrest stay;
      said at least one first extension and said at least one second extension being contacted and fixedly joined with each other, so that a through-opening area is defined therebetween at said predetermined point, wherein one side of said through-opening area is opened outwardly of the trim cover assembly while another side thereof is opened inwardly of the trim cover assembly;
      said region of the at least one first extension being folded about the free end of said at least one second extension, so that the thus-folded region closes and seals said another side of the through-opening area, with said through-opening means laying thereover,
   wherein said at least one headrest stay passes through said through-opening area and said through-opening means, such that the through-opening means is closely attached about the peripheral surface of the at least one headrest stay, thereby preventing leakage of said liquid foaming material therethrough.

2. The headrest as defined in claim 1, wherein said trim cover assembly is of a three-layer lamination structure comprising a top cover layer, a foam padding layer and a back cover layer.

3. The headrest as defined in claim 1, wherein said through-opening area is elongated in forward and backward directions of the headrest, and wherein said through-opening means associated with said at least one first extension comprises a slit whose length is slightly greater than an outer diameter of said headrest stay.

4. The headrest according to claim 3, wherein said slit extends in a direction transversely of said through-opening area.

5. The headrest as defined in claim 1, wherein said first and second extensions and said folded region of the first extension are all fixedly joined together along a pair of spaced-apart lateral end portions thereof such as to define said through-opening area between the first and second extensions and completely seal said another side of said particular through-opening area.

6. A headrest comprising:
   at least one headrest stay;
   a frame to which said at least one headrest stay is rotatably connected so that the headrest stay is free to rotate in forward and backward directions of the headrest relative to said frame;
   a trim cover assembly of three-dimensional configuration conforming to an outer shape of the headrest;
   said at least one headrest stay and said frame being placed within said trim cover assembly, such that a part of the headrest stay passes through a predetermined point in the trim cover assembly and projects outwardly therefrom;
   a foam padding provided within said trim cover assembly, said foam padding being formed and filled therein by a foaming process including the step of injecting and curing a liquid foaming material within the trim cover assembly;
   said trim cover assembly including:
      at least one first extension which is defined at said predetermined point and folded therefrom in a direction inwardly of the trim cover assembly;
      at least one second extension which is defined at the predetermined point and folded therefrom in a direction inwardly of the trim cover assembly;
      said at least one first extension being greater in length than said at least one second extension, thus having a region extending beyond a free end of said at least one second extension;
      said region of the at least one first extension having a through-opening means defied therein, said through-opening means being so arranged as to allow said headrest stay to pass therethrough while being able to be attached closely about a peripheral surface of the headrest stay;

said at least one first extension and said at least one second extension being contacted and fixedly joined with each other, so that a through-opening area is defined therebetween at said predetermined point and elongated along the forward and backward directions of the headrest, wherein one side of said through-opening area is opened outwardly of the trim cover assembly while another side thereof is opened inwardly of the trim cover assembly;

said region of the at least one first extension being folded about the free end of said at least one second extension, so that the thus-folded region closes and seals said another side of the through-opening area, with said through-opening means laying thereover, wherein said at least one headrest stay passes through said through-opening area and said through-opening means, such that the at least one headrest stay is free to rotate via said through-opening area relative to said frame, thereby allowing the headrest to be tilted forwardly and backwardly relative to the at least one headrest stay, and that the through-opening means is closely attached about the peripheral surface of the at least one headrest stay, thereby preventing leakage of said liquid foaming material therethrough.

7. The headrest as defined in claim 6, wherein said trim cover assembly is of a three-layer lamination structure comprising a top cover layer, a foam padding layer and a back cover layer.

8. The headrest as defined in claim 6, wherein said through-opening means associated with said at least one first extension comprises a slit whose length is slightly greater than an outer diameter of said headrest stay.

9. The headrest according to claim 8, wherein said slit extends in a direction transversely of said through-opening area.

10. The headrest as defined in claim 6, wherein said first and second extensions and said folded region of the first extension are all connected together along a pair of spaced-apart lateral end portions thereof such as to define said through-opening area between the first and second extensions and completely seal said another side of said particular through-opening area.

* * * * *